252-586 SR SEARCH ROOM
F211A OR T 859,007

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED FEBRUARY 4, 1969

859 O.G. 42

T859,007

768,947

PHOTOTROPIC COMPOSITIONS (B)

Gordon C. Newland and Melvin S. Bloom, both of P.O. Box 511, Kingsport, Tenn. 37662

Continuation of application Ser. No. 563,041, July 6, 1966. This application Sept. 9, 1968. Published Feb. 4, 1969

Class 106—176

No Drawing. 9 Pages Specification

Phototropic composition comprising a mixture of a cellulose ester resin and an effective amount of a phototrope having the general formula:

(I)

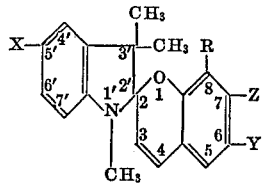

and containing the substituents defined in Table A in the specification in the positions indicated in the formula.